April 21, 1970   C. PROCHNOW ET AL   3,507,197
ROLL FILM CASSETTE

Filed Aug. 25, 1967   4 Sheets-Sheet 4

United States Patent Office 3,507,197
Patented Apr. 21, 1970

3,507,197
ROLLFILM CASSETTE
Claus Prochnow, and Kurt Bode, Braunschweig, Germany, assignors to Rollei-Werke Franke & Heidecke, Braunschweig, Germany, a German firm
Filed Aug. 25, 1967, Ser. No. 667,030
Claims priority, application Germany, Aug. 26, 1966, R 44,000
Int. Cl. G03b 19/04
U.S. Cl. 95—31                                    10 Claims

ABSTRACT OF THE DISCLOSURE

A film cassette for attachment to a photographic camera. When the cassette is attached to the camera body, the film take-up spool in the cassette is driven from mechanism within the camera body, to advance the film from one frame position to the next frame position, the drive mechanism in the cassette being responsive to the amount of film already fed to decrease the amount of angular rotation of the take-up spool during successive feeding operations, to compensate for the increasing effective diameter of the spool as more film is wound thereon. A knob on the cassette is used for initial advance of the film to the first frame position. When the film is advanced to this first frame position, the feeding mechanism within the cassette is temporarily locked and cannot be operated by the mechanism within the camera body until the knob on the cassette has been pushed in to an inaccessible position, which unlocks the feeding mechanism so thereafter the feeding mechanism in the cassette can be operated by the operating mechanism in the camera body. The feeding knob on the cassette is restored to its accessible position when the counting mechanism shows that the last frame has been exposed, and also whenever the rear door of the cassette is opened. Removal of the cassette from the camera body restores the knob to its accessible position so it may be used for winding up the trailing end of the film.

---

The invention relates to a rollfilm cassette having a film wind-on mechanism, which can be connected with the wind-on and shutter-cocking mechanism of the camera so as to be operated thereby when the cassette is attached to the camera.

Due to the constantly varying film roll diameter during winding-on of the film it is necessary to provide means so that as the wind-on mechanism is moved in equal steps the film is also. This means can either be provided in the wind-on mechanism of the camera or the cassette and in this invention such means is provided in the wind-on mechanism of the cassette which simplifies the construction of the wind-on mechanism of the camera.

It is desirable to be able to wind the leading edge of the film on to the take-up spool even when the cassette is not in the camera so that when the cassette is inserted into the camera, the film is immediately ready for exposure. It is also desirable for the cassette to be removable from the camera regardless of the number of pictures which have been taken and without the danger of double exposures, unexposed pictures or overlapping pictures occurring.

According to the present invention there is provided a rollfilm cassette having a film wind-on mechanism for step by step winding of a film which mechanism is connected to the wind-on mechanism of a camera when the cassette is placed in the camera, wherein the wind-on mechanism of the cassette has a winding knob which is movable to a depressed position in which it can no longer be gripped for rotation and wherein there is provided locking means for locking said knob in said depressed position and means for preventing the locking means locking the knob during winding-on of lead and follower strips of a film.

A constructional embodiment of the invention will now be described, by way of example with reference to the accompanying drawing, wherein.

The discs 1, 2, 3 and 4 are rotatably mounted on a common spindle. The disc 1 has spur teeth and is coupled, on attachment of the cassette to the camera, with the wind-on mechanism of the camera.

Figure 4:
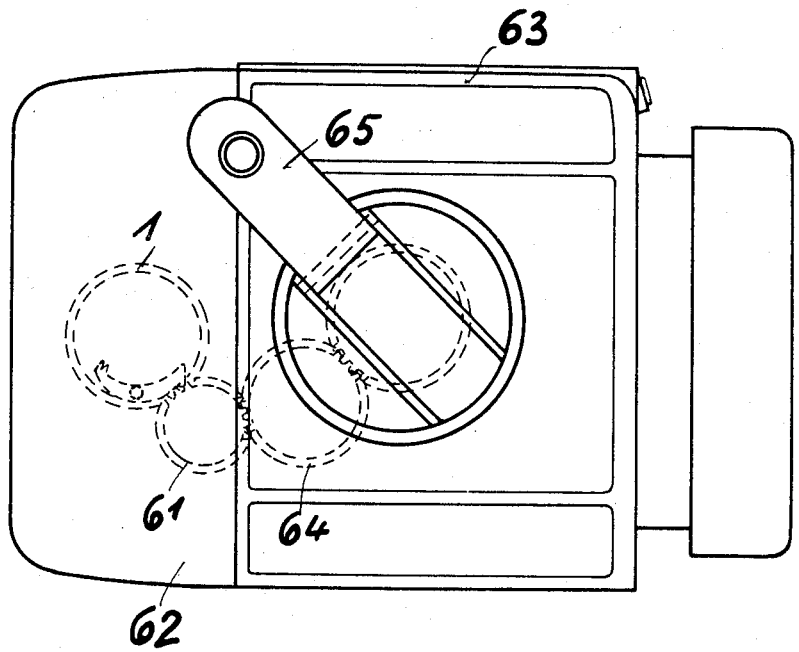
FIGURE 4 shows a side view of the camera with set-on cassette.

The FIGURE 4 presents a side view of the camera 63 with the cassette 62 attached thereto. The drive of the disk 1 is effected through a spur-wheel 61 protruding from the front side of the cassette 62 and to connect it with a corresponding spur-wheel 64 on the camera 63. The crank 65 of the camera turns forwards and backwards with the same angle of rotation. By turning it forward in a clockwise direction, the shutter and the reflex mirror are set and by turning the crank backwards, the film transport in the cassette is operated. For this reason it is not necessary to have a special stop of the film feeding in the cassette itself, since the drive is effected by the always uniform stroke of the crank. Therefore the disc 1 is also rotated forwards and back with constant stroke.

Figure 1:
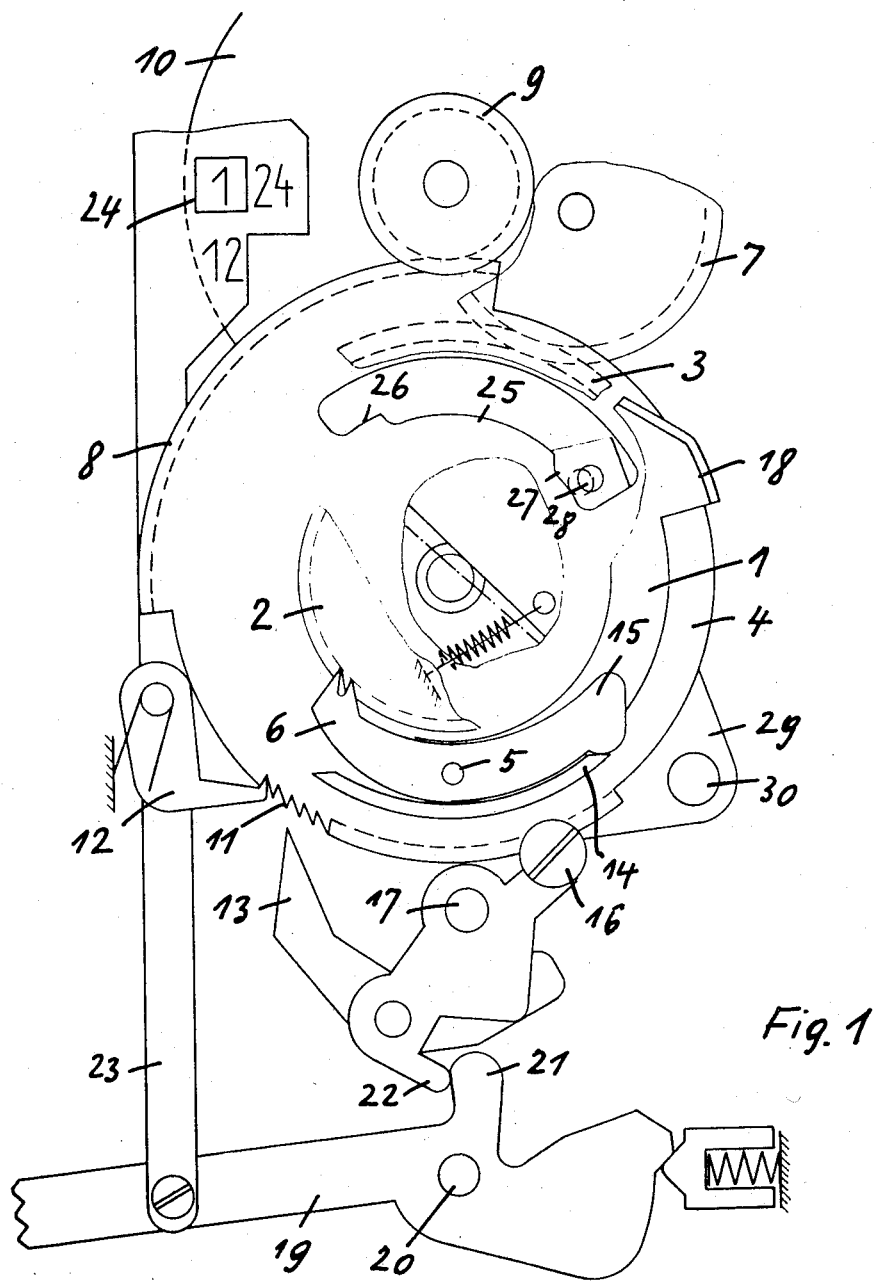
FIGURE 1 shows an illustration of the essential parts of the cassette wind-on mechanism.
Figure 2:
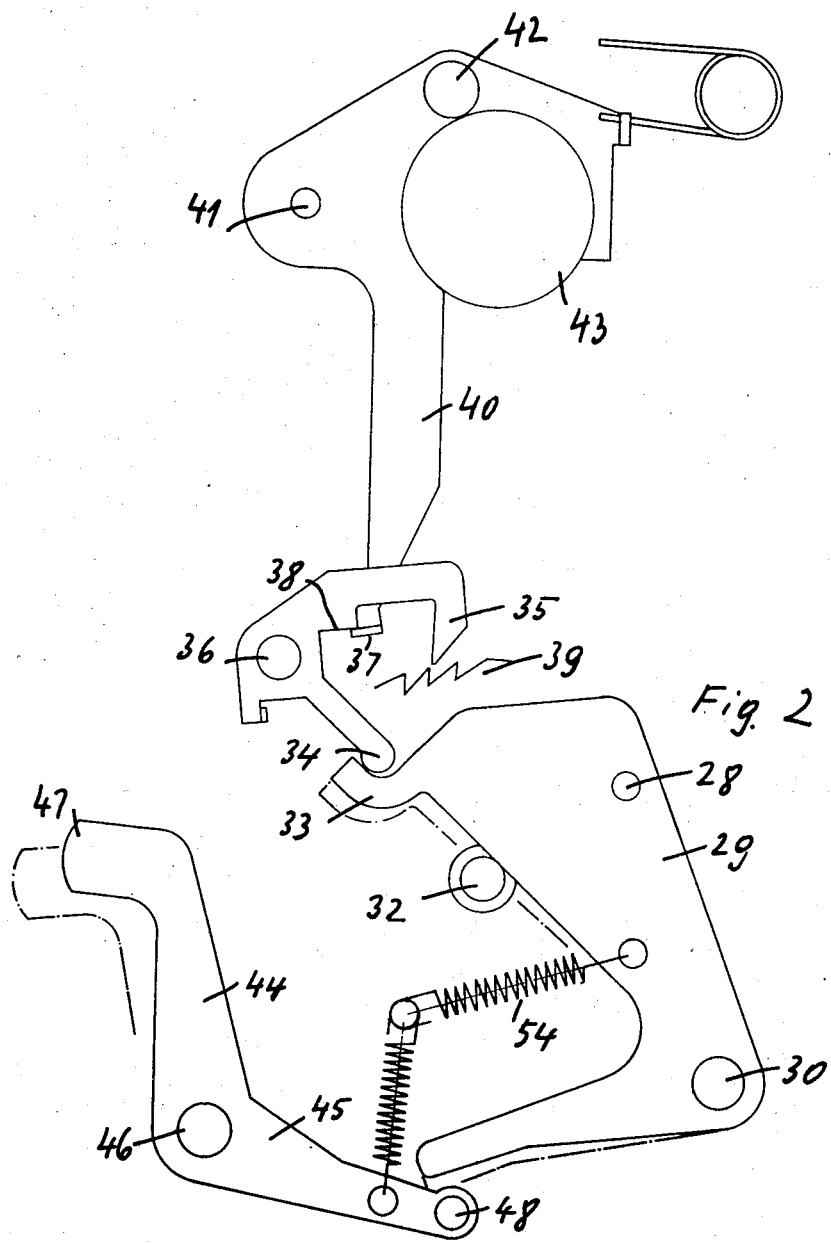
FIGURE 2 shows the mechanism parts which are effective when the film is being attached to the take-up spool.
Figure 3:
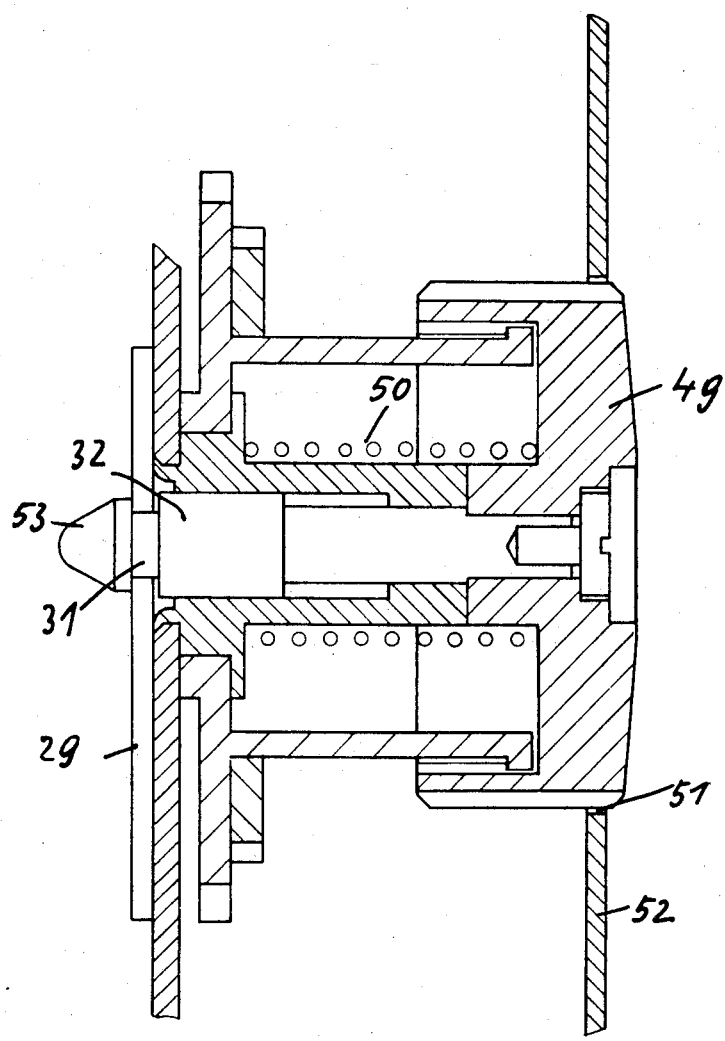
FIGURE 3 shows a cross-section through the cassette film wind-on knob.

FIGURES 1, 2 and 3 of the application are relating only to the drive of the take-up spool. The take-up spool is mounted on the same shaft as the spur-wheel 7 (FIG. 1). The button (FIG. 3) is mounted concentrically to the disks 1, 2, 3, 4 of FIG. 1, too.

An engaging pawl 6, which engages with the pawl wheel 2, is rotatable on the pin 5 of the disc 1. On rotation of the disc 1 in the clockwise direction the pawl wheel 2 is entrained. The toothed wheel 3 which drives the film winding wheel 7 is rigidly connected with this wheel 2.

From the feeding spool which is not shown, the film runs between the rollers 43 and 42 straight to the film take-up spool which is mounted on the shaft of the spur-wheel 7.

The disc 4 carries a toothed segment 8 which engages with the toothed wheel 9 of the indicator disc 10. Moreover the disc 4 also carries ratchet teeth 11 with which the blocking pawl 12 and the stepping pawl 13 co-operate. Furthermore, a guide rib 14 for the end 15 of the pawl 6 is also arranged on the disc 4. The pawl 13 is pivotable about the pin 17 and lies with its end 16 in the region of a dog 18 of the disc 1 in such manner that this dog 18, on rotation of the disc 1 in the clockwise direction, strikes against the pin 16, brings the pawl 13 into engagement with the teeth 11 and thus steps the disc 4 further by one step. By means of a lever 19 which is rotatable about the pin 20 it is possible to adjust the position of the pawl 13 and the stop 21 for the pawl end 22, and in fact the arrangement is so selected that according to the position of the lever 19 the pawl 13 steps the disc 4 further by one or two tooth divisions.

The pawl 13 is of course spring-loaded in order to engage with the ratchet teeth 11.

The adjustable window 24 for the indicator disc 10 is connected with this adjustable lever 19 through a draw rod 23, and in fact in this way it is possible to change the window 24 so that the indicator disc shows "1" to "12" or "1" to "24." The rib 14 of the disc 4 accompanies this step by step further movement of the disc 4 and thus step by step varies the point of engagement of the pawl 6. Thus the angle of rotation of the toothed wheel 3 is shortened step by step, and thus the increasing roll diameter of the take-up spool is compensated, so that equal picture intervals are obtained. When film without protective paper for 24 exposures is used, in this case by appropriate setting of the lever 19 the disc 4 is stepped by one tooth division further at each feed step, in the case of backed film for 12 exposures on the other hand it is stepped by two tooth divisions, in order to take account of the increase of diameter of the film roll. The disc 4 also carries a control cam recess 25 with the steps 26 and 27. On this stepped cam there rests a pin 28 which is seated on a double-armed lever 29 which is pivotable about the peg 30 and which lever 29 can drop as locking lever into a groove 31 of the spindle 32. When the pin 28 rests on the cam part 25, the lever 29 is pivoted out so far that it just engages in the groove 31. When the pin 28 slides up on to the step 26 the lever 29 is lifted out of the groove 31 of the spindle 32, which is pivoted concentrically and movable axially inside of the hollow central shaft shown in FIG. 1. The end 33 of the lever 29 (FIGURE 2) co-operates with the extension 34 of a pawl 35 which is rotatable about the pin 36. On pivoting of the lever arm 29 in the clockwise direction this pawl 35 is pivoted in the anti-clockwise direction, so that a tab 37 of the resilient lever 40 can slide beneath its edge 38 and holds it fast in the position as illustrated in FIGURE 2, which it is lifted out of the pawl wheel 39. The pawl wheel 39 is rigidly connected with the film feed wheel 2 or 3. The resilient lever 40 is pivotable about the pin 41 and carries roller 42 between which roller and a film guide roller 43, there is a narrow space. This narrow space is so dimensioned that the backing strip of a film can run between the rollers 42 and 43, but that the leading edge of the protective paper on the film forces the roller 42 so far outwards that the tab 37 is lifted away from the pawl 38 and the pawl 35 can drop into the ratchet teeth 39, whereby further stepping of the film is prevented. By means of the double-armed lever system 44, 45, which is rotatable about the pin 46 and the free end 47 of which lies in the region of the cassette cover, when the rear wall of the cassette is opened the lever 29 and 30 is pivoted outwards in the clockwise direction by means of the pin 48, so that the pawl 35 is lifted out of the ratchet teeth 39 and is held in this position by the tab 37 of the linkage 40. On closing of the rear wall of the cassette the lever 47 is pressed inwards so that the lever 29 can pivot in on to the spindle 32 in the anti-clockwise direction (see position in dot-and-dash lines in FIGURE 2). The film feed knob 49 according to FIGURE 3 is pressed outwards by a spring 50 out of the opening 51 of the cassette wall 52, so that its spindle 32 does not hinder the pivoting-in of the lever 29. The end 53 of the knob spindle 32 is conical, so that on pressing-in of the knob 49 the lever 29 can be forced away and snap into the groove 31 of the knob spindle shaft, so that the knob is locked in this pressed-in position. In this position (in solid lines in FIGURE 2) the pawl 35 is held lifted out of the ratchet teeth 39 by the lever arm end 33.

If now the cassette is loaded with a new film spool and the paper lead is drawn through between the rollers 42 and 43 and fastened to the take-up spool, and then the cassette is closed, the lever 47 is pivoted in the clockwise direction, thus releasing the lever 29, so that the latter is pivoted by the spring 54 in the anti-clockwise direction. With its end 33 the lever 29 releases the extension 34 of the pawl 35, which however is prevented from dropping into the ratchet teeth 39 by the tab 37 of the lever 40. The film lead is wound-on by rotation of the film winding knob 49, until the film adhesive strip comes between the rollers 42 and 43 and forces the roller 42 outwards. Thus the tab 37 of the lever 40 slides off from the pawl 35, which now drops into the ratchet teeth 39 and prevents further film winding. In this position the first picture field is situated in the picture window and the indicator disc is in its initial position in which the number "1" appears behind the window 24. Further conveying of the film by the cassette rotating knob 49 is now prevented, as also transport of the film after the attachment of the cassette to the camera by the wind-on mechanism of the camera. If now the film winding knob 49 is pressed into the cassette housing, its conical tip 53 displaces the lever arm 29 outwards until it can drop back again into the groove 31 and thus locks the knob 49 in the pressed-in position. Due to the pivoting of the lever 29 in the clockwise direction thus effected, the pawl 35 is and remains lifted out of the ratchet teeth 39, so that the film feed can now be effected by the wind-on mechanism of the camera.

At every actuation of the camera wind-on mechanism the disc 1 is rotated forwards and back and in this rotation entrains the film spool 7. At the same time at every film feed action the counting disc 8 is stepped further by one or two tooth divisions. Thus the control stop 14 for the pawl 15 also travels, so that a continuously diminishing rotation of the film spool takes place at every stroke. The pin 28 of the lever here travels on the cam part 25. When the full picture number is reached, the step 26 of this cam lifts the pin 28 so that the lever 29 is pivoted outwards and is lifted out of the groove 31 of the knob spindle, so that the latter springs outwards under the influence of its spring 50. This makes free the possibility of winding-on the film follower strip by means of the knob 49. At the same time thus the complete exposure of the contents of the cassette is indicated.

What we claim is:

1. A rollfilm cassette having a film wind-on mechanism for step by step winding of a film which mechanism is connected to the wind-on mechanism of a camera when the cassette is placed in the camera, wherein the wind-on mechanism of the cassette has a winding knob which is movable to a depressed position in which it can no longer be gripped for rotation and wherein there is provided locking means for locking said knob in said depressed position and means for preventing the locking means locking the knob during winding-on of lead and follower strips of a film.

2. A cassette as claimed in claim 1, wherein the knob is mounted on a spindle movable axially against the action of a spring into said depressed position, the end of the spindle remote from the knob being provided with a groove, said locking means comprising a lever which lies in the plane of the groove when the knob is depressed, the means for preventing locking comprising a cam on a rotatable disc adapted to be driven by the camera wind-on mechanism and a cam follower pin mounted on said lever and engaging said cam.

3. A rollfilm cassette as claimed in claim 2, wherein said lever lies by means of an extension in the path of a ratchet pawl in such manner that this pawl is held during the winding-on of the lead strip and can engage ratchet teeth upon its release by a sensing mechanism which senses the leading edge, the pawl being lifted out of the ratchet teeth during the winding-on of the film and its follower strip, by said lever.

4. A rollfilm cassette as claimed in claim 3, wherein said lever additionally lies in the path of a feeler lever operated by the rear wall of the cassette, in such manner that on opening of the cassette rear wall it is transferred into the inoperative position, entraining the ratchet pawl.

5. A rollfilm cassette as claimed in claim 1, wherein said wind-on mechanism of the cassette includes a drive wheel in the cassette, a film wind-on wheel in the cassette, a pawl arranged on one of said wheels and engaging the other of said wheels to drive said wind-on wheel from motion of said drive wheel, a counting mechanism drive disc, and means moving with said counting mechanism drive disc for determining the duration of engagement of said pawl to vary the extent to which said wind-on wheel is driven by said drive wheel upon each actuation of the latter.

6. A cassette as claimed in claim 5, in which said means moving with said counting mechanism drive disc is a control rib (14) on said drive disc (4) for engaging a portion (15) of said pawl (6).

7. A cassette as claimed in claim 5, further including a stepping pawl (13) for engaging said counting mechanism drive disc (4), and an engaging portion (18) on said cassette drive wheel (1) to engage said stepping pawl at each actuation of said cassette drive wheel to cause said stepping pawl to advance said counting mechanism drive disc step by step upon successive actuations of said cassette drive wheel.

8. A cassette as claimed in claim 7, further including means for adjusting the feeding stroke of said stepping pawl so that when said adjusting means is in one position, each actuation of said stepping pawl by said cassette drive wheel will turn said counting mechanism drive disc to one extent and when said adjusting means is in another position, each actuation of said stepping pawl will turn said counting mechanism drive disc to a different extent.

9. A photographic camera having a body and a film cassette detachably mounted on said body, film advancing means in said cassette, driving means in said body for normally driving said film advancing means in said cassette while said cassette is mounted on said body, a feeding knob on said cassette, said knob having a first position projecting outwardly from said cassette so as to manually accessible and a second position mainly within said cassette and not accessible for manual actuation, said knob being operatively connected to said film advancing means in said cassette to drive said advancing means by rotation of said knob, sensing means in said cassette for sensing passage of a leader strip and arrival of a first exposure area of film in an exposure position, said knob when in said first position being operable to feed said leader strip and bring said first exposure area to said exposure position, means responsive to said sensing means for locking said film advancing means when said first exposure area reaches said exposure position, and means responsive to movement of said knob from said first position to said second position for unlocking said locking means so that said driving means in said camera body may operate said film advancing means while said knob is in said second position.

10. A camera as defined in claim 9, further including a spring tending to move said knob from said second position to said first position, a latch for holding said knob in said second position against the force of said spring when said knob has been moved to its second position, and means effective upon advancing film to a predetermined extent for releasing said latch so that said spring may move said knob from said second position to said first position.

References Cited
UNITED STATES PATENTS 2,581,691    1/1952    Moomaw _____ 95—31
2,762,280    9/1956    Von Lowis _____ 95—31

NORTON ANSHER, Primary Examiner

D. S. STALLARD, Assistant Examiner

U.S. Cl. X.R.

242—71.1